3,305,071
FRUIT PREPARATION MACHINE
Gerald R. Anderson, Campbell, Calif., assignor to FMC
 Corporation, San Jose, Calif., a corporation of Delaware
Filed Sept 13, 1965, Ser. No. 487,014
9 Claims. (Cl. 198—33)

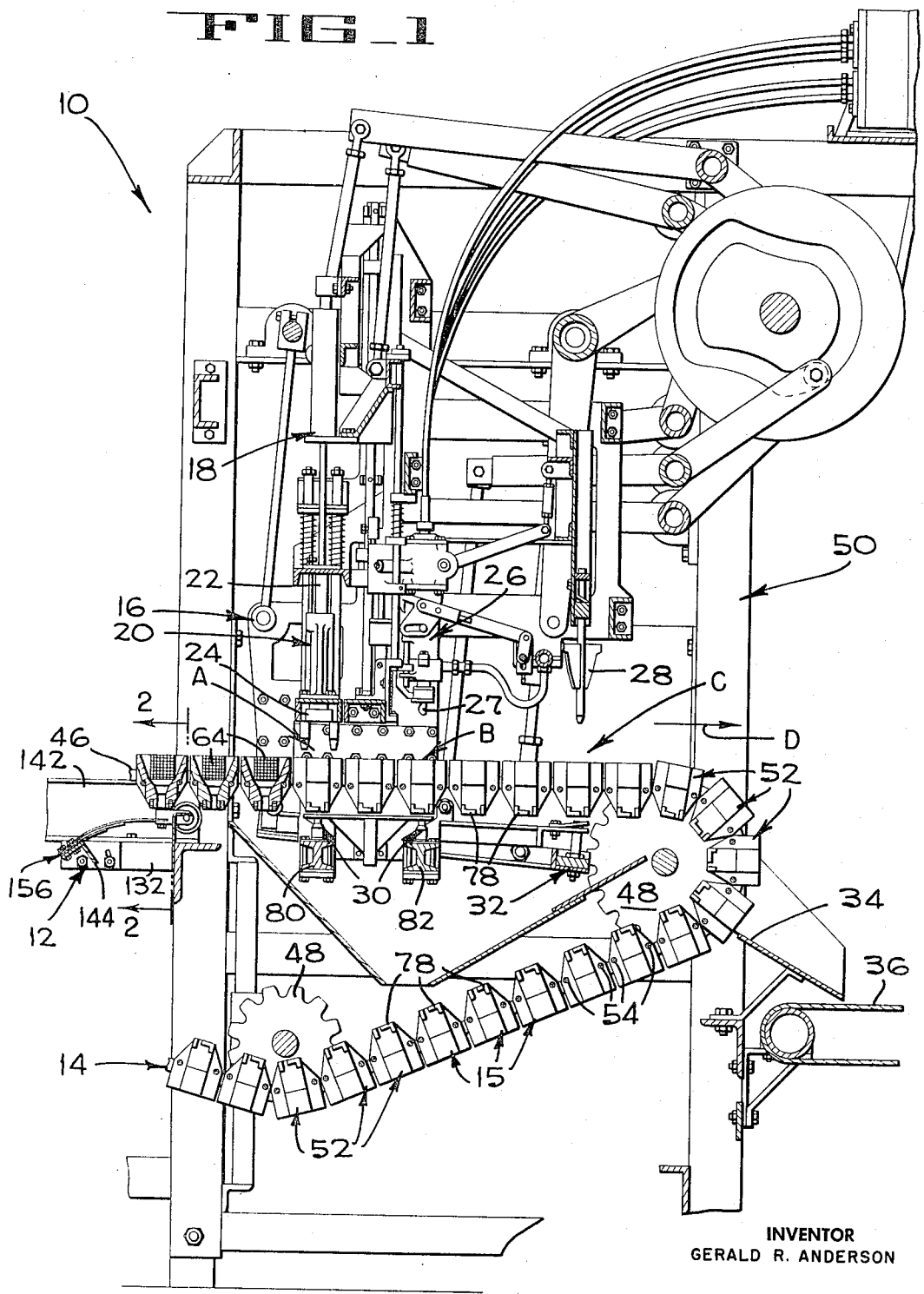

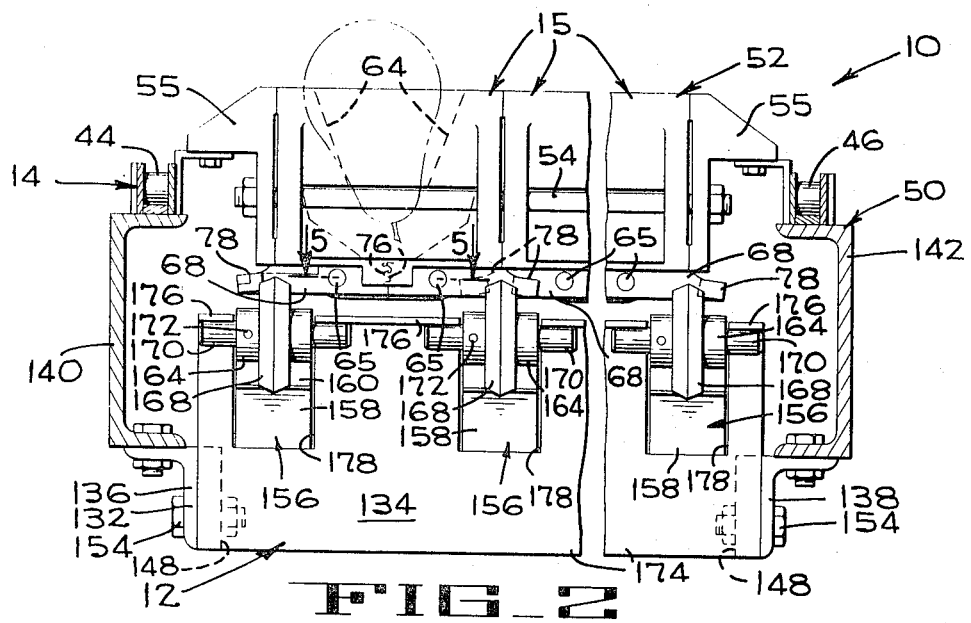
FIG_2
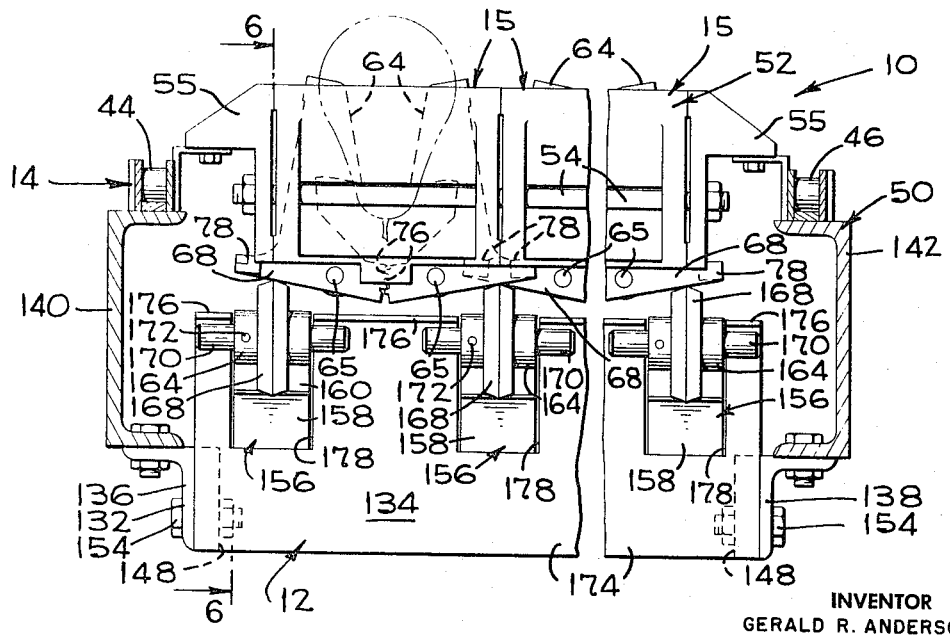
FIG_3
INVENTOR
GERALD R. ANDERSON
BY Hans G. Hoffmeister
ATTORNEY

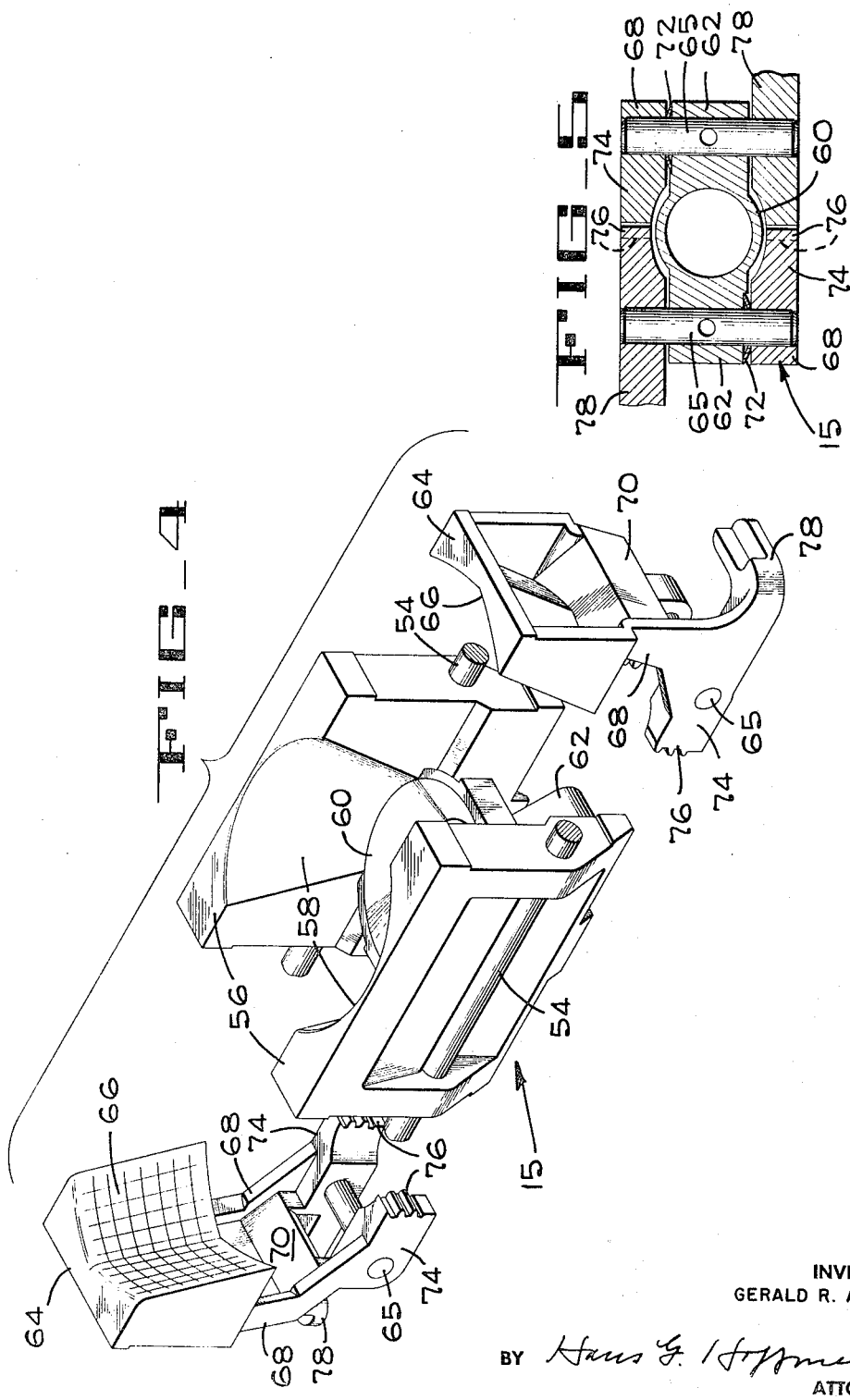

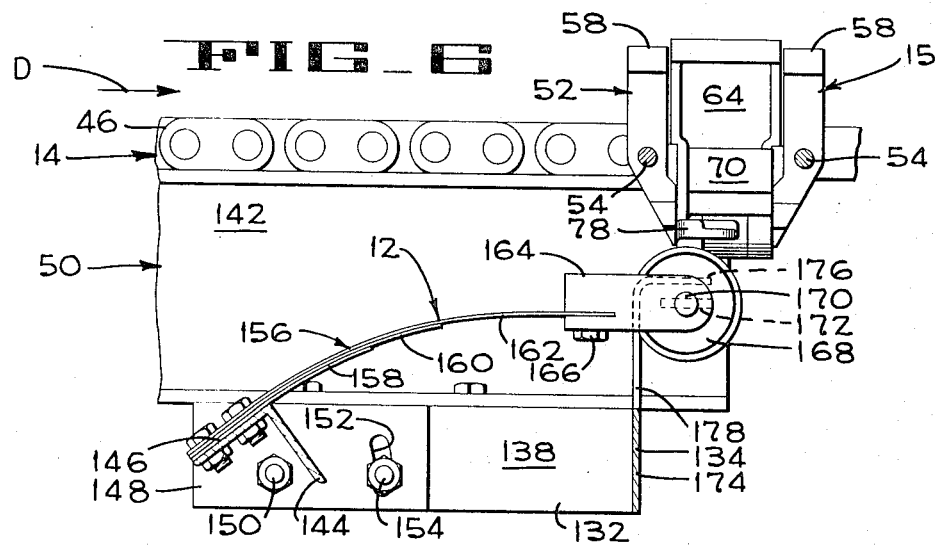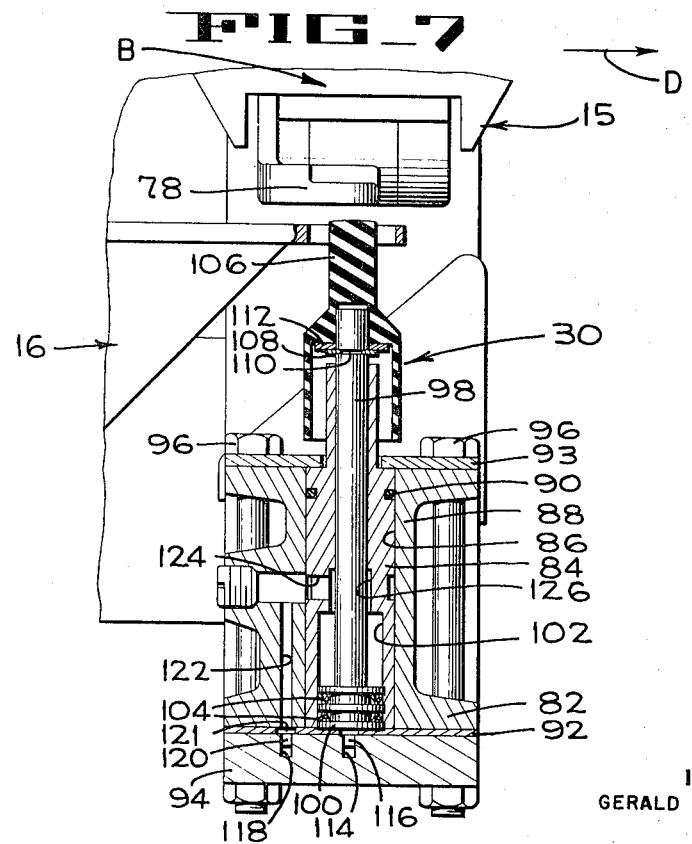

The present invention pertains to fruit preparation machines and more particularly relates to a preclosing apparatus for closing the jaws of fruit supporting and orienting cups prior to the movement of the cups into fruit processing stations.

The apparatus of the present invention is adapted for use in the type of fruit preparation machine disclosed in the pending United States patent application of Gerald R. Anderson et al. Serial No. 221,174, which application was filed on September 4, 1952, is assigned to the assignee of the present invention, and issued on August 10, 1965 as Patent No. 3,199,558.

In the above type of fruit preparation machine, a plurality of fruit supporting and orienting cups are mounted on an endless conveyor which advances the cups past a plurality of processing stations, one of the stations being a stemming station and another station being a coring station. In order to perform the stemming and coring operations on the pears in the cups as the cups move past the stations, it is essential that the stem-blossom axis of each pear be oriented and held in a vertical position prior to the engagement of the pear by a stemming tube at the stemming station. For this purpose, each cup is provided with pivotal jaws, which in accordance with the above-mentioned Anderson et al. application, were closed by pneumatic means against the pear therein to orient the pear after the cup had entered the stemming station. The present invention also concerns apparatus for orienting pears and it is one object of the present invention to provide an apparatus for closing jaws of a fruit supporting cup against a fruit therein to align the fruit so that its stem-blossom axis is vertical prior to moving the fruit into a fruit processing station.

Another object is to provide an apparatus for positively closing the jaws of a fruit supporting cup for centering a fruit therein prior to entering a stemming and coring station and for firmly holding the jaws closed while in said stations.

Another object is to provide an apparatus for positively closing the jaws of a plurality of transversely aligned cups against fruit of different sizes therein to align the fruit so that their stem-blossom axes are vertical.

Another object is to provide a jaw closing apparatus for closing the jaws of a plurality of transversely aligned cups against the fruit therein wherein the closing force applied to all cups may be simultaneously varied.

Other objects and advantages of the present invention will become apparent from the following description and the accompanying drawings, in which:

FIGURE 1 is a vertical longitudinal section of the stemming, coring, and splitting stations of a pear processing machine incorporating the jaw preclosing apparatus of the present invention.

FIGURE 2 is an enlarged vertical transverse section taken along lines 2—2 of FIGURE 1 illustrating the fruit supporting cups in an open position.

FIGURE 3 is an enlarged vertical section similar to FIGURE 2 but illustrating the jaw preclosing apparatus holding the fruit supporting cups in closed position with the stem-blossom axis of the fruit in vertical position.

FIGURE 4 is an exploded perspective of one of the fruit supporting cups.

FIGURE 5 is a horizontal section taken along lines 5—5 of FIGURE 2 illustrating resilient cup-shaped friction washers which hold the jaws in adjusted position after the cups move out of contact with the pre-closing apparatus.

FIGURE 6 is a vertical section taken along lines 6—6 of FIGURE 3 showing the jaw pre-closing apparatus in the jaw closing position. Only one cup being shown.

FIGURE 7 is an enlarged vertical section taken through one of the pneumatic jaw closing cylinders.

The pear processing machine 10 (FIG. 1) with which the cup pre-closing apparatus 12 of the present invention is used includes a continuously driven conveyor 14 having a plurality of transverse rows of fruit supporting cups 15 thereon which carry multiple lanes of fruit sequentially past a stemming station A, a coring station B, and a splitting station C. During the stemming and coring operations, a carrier frame 16 swings above the conveyor 14 in the direction of movement of the conveyor and in timed relation therewith, and carries a vertically movable main support bracket 18. A stemming unit 20, which includes a stemming tube 22 and a fruit seater 24, is mounted on the main support bracket 18 above each lane of cups and moves up and down with the bracket to effect the stemming operation at the stemming station A. A coring head unit 26 is indirectly supported by the main support bracket 18, the bracket 18 causing the coring head 26 to lower into coring position at the coring station B and to then raise to its retracted position after the fruit is cored.

During the stemming operation at the stemming station A, the fruit seater 24 moves downwardly to engage the upper surface of the fruit, and immediately thereafter, the stemming tube 22 is inserted through the fruit to remove a cylindrical segment containing the stem material from the fruit. Thereafter, the tube 22 and fruit seater 24 return to the retracted position above the fruit. The fruit is then moved into the coring station B at which time a coring cutter 27 enters the cylindrical cavity in the fruit and removes the core therefrom. The stemmed and cored fruit is then moved to the splitting station C where the fruit is split into segments by a splitting knife 28 unless it is desired to retain the cored fruit in one piece in which case the splitting knife 28 is removed from the support bracket 18 of the machine 10.

When the cups 15 are in the stemming station A and coring station B, vertically reciprocable pneumatic cylinders 30 carried by the swinging carrier frame 16 engage the cups to hold the cup jaws closed during processing at these stations. As mentioned previously, after the fruit has been stemmed and cored it is moved into the splitting station C where it is split. While in the splitting station C, a fruit lifter 32 opens the jaws of the cups 15 and unseats the segmented fruit from the cups 15, allowing the fruit to fall from the conveyor 14 onto a chute 34 which directs the fruit onto a take away conveyor 36 for further processing by mechanisms not shown.

As mentioned previously, the fruit supporting cups 15 are arranged in multiple lanes extending longitudinally on the conveyor 14, which conveyor includes a pair of spaced chains 44 and 46 that are trained around sprockets 48 (only two being shown in FIGURE 1) journalled on the frame 50 of the machine 10. The cups 15 are arranged in equally spaced transverse rows or flights 52 with each flight including a pair of tie rods 54 which extend transversely of the conveyor and are secured to angle brackets 55 which are, in turn, secured to the chains 44 and 46 as by bolting. Each pair of rods 54 supports a plurality of cups 15 and all of the cups are identical.

Each cup 15 (FIG. 4) comprises a pair of spaced confronting side walls 56 individually mounted on the associated tie rods 54. Each side wall has an upper recess 58 formed as a segment of a frusto-conical member that is concentric with the vertical axis of the cup 15.

Each cup has a lower apertured frusto-conical bowl portion 60 that is integral with and extends between the side walls and is also concentric with the cup axis. A pair of apertured bosses 62 (FIG. 5) are formed on the lower portion of the bowl 60 and project outwardly from opposite sides of the bowl portion in a plane lengthwise of the transverse flight.

Each of the fruit centering and supporting cups 15 has an opposed pair of moveable jaws 64 pivotally connected to the bosses 62 by pins 65 for pivotal movement between the main sidewalls 56. Each jaw has an inner angulated gripping surface 66 and downwardly projecting mounting portions 68 interconnected by webs 70. Resilient, cup-shaped washers 72 (FIG. 5) encircle the pins 65 and bear against the bosses 62 and mounting portions 68 for resisting pivotal movement of the jaws. Thus, the jaws remain in whatever position they are placed, but the washers yield to permit pivotal movement of the jaws 64 upon application of sufficient pivotal force.

The mounting portions 68 of the jaws 64 have inwardly directed segments 74 on which are formed gear teeth 76. The gear teeth of the mounting portions on corresponding sides of each cup are in mesh so that when one of the jaws is pivoted, the other jaw pivots in the opposite direction. Actuating arms 78 are formed integrally with the mounting portions 68 of the jaws 64 and project outwardly from the center of the cup considered lengthwise of the flight. Thus, both jaws of each carrier are provided with actuating arms 78 which arms may be subjected to upward forces to unitarily pivot both jaws 64 equal amounts in opposite directions from an open or retracted fruit receiving position to a closed fruit gripping or aligning position. The jaws are returned to their retracted or open position by the lifter 32 (FIG. 1) which applies upward pressure on the segments 74 inwardly of the pivot pins 65.

The aforementioned air cylinders 30 (FIGS. 1 and 7) are supported in two transverse I-beams 80 and 82 (FIG. 1) by the carrier frame 16 at a point below the upper run of the conveyor 14. It will be understood that the beam 80 will be in alignment with the cups 15 at the stemming station A and that the beam 82 will be in alignment with the cups in the coring station B during the stemming and coring operations at which time the carrier frame 16 and the upper run of the conveyor move in the direction of the arrow D at substantially the same speeds.

Since all of the air cylinders 30 are identical, only the cylinder fitted in the I-beam 82, will be described in detail.

As indicated in FIGURE 7, each air cylinder 30 comprises a sleeve 84 which is fitted in a cylindrical bore 86 in the web 88 of the I-beam 82. The sleeve 84 is sealed in the bore 86 by an O-ring 90 near its upper end and by a gasket 92 at the lower end thereof. An apertured disc 93 at the upper end of the I-beam 82, and a manifold 94 abutting the gasket 92 are clamped to the I-beam 82 by bolts 96. A piston rod 98 having a piston 100 on its lower end is slidably received in the sleeve 84 with the piston being fitted in a counter bore 102 in the sleeve and being sealed thereto by sealing rings 104. A resilient cup actuating head 106 of rubber or the like is positioned on the upper end of the rod 98 by a snap ring 108, which snap ring fits in a groove 110 in the rod, and by a co-operating washer 112. It will be understood, that each of the air cylinders 30 is positioned in its associated I-beam so as to engage one of the jaw actuating arms 78 when the associated carrier is moving in the direction of the arrow D during the stemming and coring operations.

A first elongated air passage 114 in the manifold plate 94 communicates with the lower end of each piston 100 through vertical ports 116. A second elongated air passage 118 in the manifold plate 94 communicates with the upper end of each piston 100 through vertical passages 120, 121 and 122, horizontal passages 124 and large diameter passages 126 which are concentric with the piston rod 98. Cam controlled valve means, not shown, but fully disclosed in the aforementioned Anderson et al. application, causes high pressure air to be directed into the first air passage 114 during the stemming and coring operation, and permits air to be evacuated from the second air passage 118 during this time thereby urging the resilient heads 106 against the associated jaw actuating arms 78 to hold the jaws 64 closed against the fruit. After the coring and stemming operation has been completed, and before the carrier frame 16 is returned to its forward starting position, the direction of air flow is reversed causing high pressure air to enter the second passage 118 and the air below the piston 100 to be vented through the first passage 114 thereby retracting the resilient heads 106 from engagement with the cup actuating arms 78.

The pear processing machine 10 as thus far described is disclosed in detail in the previously mentioned Anderson et al. application and reference may be had to said application if a more detailed description of these components of the machine is desired.

The cup pre-closing apparatus 12 (FIG. 1) of the present invention operates in combination with the pneumatic cylinders 30 to close the jaws of each cup on the fruit prior to entering the stemming station A and coring station B so as to align the fruit with its stem-blossom axis disposed vertically thereby assuring that the stem-blossom axis will be substantially concentric with the stemming tube 22 when it enters station A, and assuring that the jaws will be maintained in closed position at the stemming station A and coring station B during the stemming and coring operations.

The cup pre-closing apparatus 12 (FIGS. 2, 3 and 6) comprises a sub-frame 132 which includes a vertically slotted angle stop bar 134 which extends transversely of the conveyor 14 and has angle support members 136 and 138 welded to opposite ends thereof and projecting forwardly therefrom. The angle members 136 and 138 are bolted to longitudinally extending channel members 140 and 142, respectively, of the frame 50 of the pear processing machine 10. A transversely extending spring supporting angle bar 144 (FIG. 6) includes an inclined spring supporting surface 146 and has short end plates 148 welded to opposite ends thereof. The end plates 148 and angle members 136 and 138 are apertured to receive pivot bolts 150 which mount spring supporting bar 144 for pivotal movement. Holes (not shown) are drilled in the bars 136 and 138 and are aligned with arcuate slots 152 formed in the plates 148, said slots 152 being generated about the axis of each pivot bolt 150. Spring adjustment bolts 154 extend through the holes in the bars 136 and 138 and in the adjacent slots 152 thereby providing means for adjusting the inclination of the spring supporting surface 146 of the angle bar 144 and for locking the bar in desired position. The lower ends of a plurality of sets of leaf springs 156 are bolted to the inclined surface 146 of the spring support bar 144, and each set of springs 156 includes three leaf springs 158, 160 and 162 of progressively increasing lengths. A plurality of roller supporting blocks 164 are mounted on the ends of the leaf springs 162, each block being slotted to receive the upper end of an associated one of the leaf springs 162, the springs and blocks being rigidly interconnected by cap screws 166. The other end of each block is forked to receive a roller 168 which is journalled on a horizontal stub shaft 170 which is secured to the block by a pin 172 and projects outwardly from both sides therefrom.

As best shown in FIGURES 2 and 6, the previously mentioned angle stop bar 134 is provided with a vertical wall 174 and an upper horizontal abutment wall 176. A series of vertical slots 178 are provided in the upper portion of the vertical wall 174 and in the abutment wall 176, and each slot accommodated an associated one of the blocks 164 and rollers 168. The abutment wall 176 serves to limit the amount of upward movement permitted the rollers 168. As illustrated in FIGURE 2, each roller, except the end rollers, is positioned to engage two of the jaw actuating arms 78, one arm of one cup and one arm of the next adjacent cup. Thus, the jaws are closed against the fruit therein thereby orienting the fruit so that its stem-blossom axis is vertical before the fruit is advanced into the stemming station A. It will be noted that two rollers 168 cooperate to close the jaws 64 of each cup, and it has been determined that a closing force of between 4 to 7 pounds imparted by each roller 168 to the associated jaw arm 78 is adequate for closing the jaws.

In the operation of the cup pre-closing apparatus 12 of the present invention, the fruit supporting cups 15 with their jaws 64 open, are continuously moved in the direction of arrow D (FIG. 1) and each cup has a pear therein with its stem end lowermost. Prior to entering the stemming station B, the arm 78 and mounting portion 68 of each jaw 64 engages the roller 168 thereby causing the jaws of the associated cup to close against the pear therein, thereby agitating and centering the pear in the cup and orienting the pear so that its stem-blossom axis is vertical. It will be noted that the jaws 64 of all cups in one flight are simultaneously closed by the rollers 168, and that the pears in the several cups need not be of the same size since the sets of leaf springs 156 will yield so as to accommodate all sizes of pears. When no pears are present in the cups, the rollers 168 will completely close the jaws 64 of the cups 15.

After the cups 15 have moved out of contact with the rollers 168, the resilient friction washers 72 retain the jaws 64 in fruit centering position. When the cups are in the stemming station A and the coring station B, the pneumatic cylinders 30 are activated to engage the arms 78 thereby holding the jaws closed during the stemming and coring operation. After the pears have been stemmed and cored, the cups are moved into the splitting station C where they are split by the knife 28. The fruit lifter 32 then engages the segments 74 of each cup 15 between their pivot points thereby opening the cups and discharging the split fruit segments therefrom. The fruit segments are thereafter discharged onto the chute 34 which guides the segments to the take-away conveyor 36 for discharge from the machine.

From the foregoing description it is apparent that the cup pre-closing apparatus of the present invention includes a plurality of resiliently mounted rollers which engage jaw actuating arms for agitating and close the jaws prior to the entry of the cups into the stemming station thereby assuring that the pears in the cups will be oriented with their stem-blossom axes vertical prior to being engaged by the stemming tube. Additionally, the pre-closing apparatus cooperates with the pneumatic cylinders at the stemming and coring stations to first assure that the jaws are closed and the pears are aligned prior to being engaged by the stemming and coring units, and to then assure that the jaws are held closed during the stemming and coring operations.

While one embodiment of the present invention has been shown and described, it will be understood that various changes and modifications may be made without departing from the spirit of the invention for the scope of the appended claims.

Having thus described the present invention and the manner in which the same is to be used, what is claimed as new and desired to be protected by Letters Patent is:

1. In a fruit preparation machine, the combination of a driven conveyor, a fruit carrying cup on said conveyor movable by said conveyor along a predetermined path past a processing station, a movable jaw on said cup, an actuating arm on said jaw, and jaw closing means disposed in the path of movement of said arm for engaging said arm while said cup is moving toward said processing station and closing said jaw prior to the movement of said cup into the processing station.

2. In a fruit preparation machine, the combination of a driven conveyor, a fruit carrying cup on said conveyor movable by said conveyor along a predetermined path past a processing station, a movable jaw on said cup, an actuating arm on said jaw, jaw closing means, and resilient means holding said jaw closing means in the path of movement of said arm for closing said jaw while said cup is moving toward said processing station and prior to the movement of said cup into the processing station, said resilient means adapted to yield after said jaw has closed against a fruit in the cup permitting the cup to move therepast into said processing station.

3. In a fruit preparation machine, the combination of a driven conveyor, a fruit carrying cup on said conveyor movable by said conveyor along a predetermined path past a processing station, a pair of opposed movable jaws pivotally mounted on said cup, means interconnecting said jaws for equal movement in opposite directions, an arm connected to one of said jaws, a roller disposed in the path of movement of said arm, and resilient means supporting said roller for engagement with said arm prior to said cup entering said processing station and adapted to yield upon closing of said jaw against the fruit in said cup.

4. In a fruit preparation machine, the combination of a conveyor, a fruit carrying cup on said conveyor movable by said conveyor along a predetermined path past a processing station, a pair of fixed opposed walls on said cup for supporting a pear therein, a pair of opposed movable jaws pivotally mounted on said cup between said walls, means interconnecting said jaws for equal movement in opposite directions, an arm connected to one of said jaws, a roller disposed in the path of movement of said arm, and resilient means supporting said roller for engagement with said arm prior to said cup entering said processing station and adapted to yield after first closing said jaws against the fruit in the cup thereby orienting the fruit with its stem-blossom axis vertical and permitting the cup to move past the processing station.

5. In a fruit preparation machine, the combination of a driven conveyor, a fruit carrying cup on said conveyor movable by said conveyor along a predetermined path past a processing station, a pair of fixed opposed walls on said cup for supporting a pear therein, a pair of opposed movable jaws pivotally mounted on said cup between said walls, means interconnecting said jaws for equal movement in opposite directions, an arm connected to one of said jaws, a roller disposed in the path of movement of said arm, resilient means supporting said roller for engagement with said arm prior to said cup entering said processing station and adapted to yield after first closing said jaws against the fruit in the cup thereby orienting the fruit with its stem-blossom axis vertical and permitting the cup to move past the processing station, and means on said cup for maintaining said jaws in closed position after said arm moves out of engagement with said roller and until said cup enters said processing station.

6. In a fruit preparation machine, the combination of a driven conveyor, a fruit carrying cup on said conveyor movable by said conveyor along a predetermined path past a processing station, a pair of fixed opposed walls on said cup for supporting a pear therein, a pair of movable jaws pivotally mounted on said cup between said walls, means interconnecting said jaws for equal movement in opposite direction, an arm connected to one of said jaws, a roller disposed in the path of movement of said arm, resilient means supporting said roller for engagement with said arm prior to said cup entering said processing station and adapted to yield after first closing said jaws against the fruit in the cup thereby orienting the fruit with its stem-blossom axis vertical and permitting the cup to move past the processing station, and means for varying the resilient force acting on said roller to close the jaws.

7. In a fruit preparation machine, the combination of a driven conveyor, a fruit carrying cup on said conveyor movable by said conveyor along a predetermined path past a processing station, a pair of fixed opposed walls on said cup for supporting a pear therein, a pair of opposed movable jaws pivotally mounted on said cup between said walls, means interconnecting said jaws for equal movement in opposite directions, an arm connected to one of said jaws, a roller disposed in the path of movement of said arm, resilient means supporting said roller for engagement with said arm prior to said cup entering said processing station and adapted to yield after first closing said jaws against the fruit in the cup thereby orienting the fruit with its stem-blossom axis vertical and permitting the cup to move past the processing station, and means at said processing station for exerting a closing force against said arm to hold said jaws closed during processing of the fruit at said station.

8. In a fruit preparation machine, the combination of a conveyor, a plurality of fruit carrying cups on said conveyor movable by said conveyor along a predetermined path past a processing station, said cups being arranged in a flight extending transversely of said conveyor, each cup including a pair of fixed opposed walls for supporting a pear therein, each cup having a pair of opposed movable jaws pivotally mounted thereon between said walls, means interconnecting the jaws of each cup for equal movement in opposite directions, an arm connected to one of the jaws of each interconnected pair of jaws, a roller disposed in the path of movement of each arm, resilient means supporting each of said rollers for engagement with said arm prior to said cups entering said processing station, each resilient means adapted to yield after first closing said associated pair of jaws against the particular size of fruit in said associated cup to thereby orient the fruit in each cup with its stem-blossom axis vertical and permitting the cup to move past the processing station, and means for simultaneously varying the force acting on each of said rollers to close said jaws.

9. In a fruit preparation machine, the combination of a conveyor, a fruit carrying cup on said conveyor and movable by said conveyor along a predetermined path past a processing station, a pair of fixed opposed walls on said cup for supporting a fruit therein, a pair of opposed movable jaws pivotally mounted on said cup between said walls, means interconnecting said jaws for equal movement in opposite directions, an arm connected to each of said jaws, one of said arms having a roller engaging portion lying in a plane forward of a vertical transverse plane passing through the center of the cup and the other arm having a roller engaging portion lying in a plane rearward of said vertical transverse plane, a roller disposed in the path of movement of each of said arms, a leaf spring supporting said rollers for engagement with said arms and roller engaging portions prior to said cup entering said processing station and adapted to agitate said jaws and to yield after first closing said jaws against the fruit in the cup thereby orienting the fruit with its stem-blossomed axis vertical and permitting the cup to move past the processing station, resilient friction applying means on said cup for maintaining said jaws in closed position until said cup enters said processing station, means for simultaneously varying the resilient force acting on said rollers to close said jaws, and means at said processing station for exerting a closing force against said arms to hold said jaws closed during processing of the fruit at said station.

References Cited by the Examiner
UNITED STATES PATENTS
3,199,558  8/1965  Anderson _____ 146—40

EVON C. BLUNK, *Primary Examiner.*
RICHARD E. AEGERTER, *Examiner.*

UNITED STATES PATENT OFFICE
CERTIFICATE OF CORRECTION

Patent No. 3,305,071                            February 21, 1967

Gerald R. Anderson

It is certified that error appears in the above identified patent and that said Letters Patent are hereby corrected as shown below:

Column 1, line 17, "1952" should read -- 1962 --.

Signed and sealed this 16th day of September 1969.

(SEAL)
Attest:

Edward M. Fletcher, Jr.                        WILLIAM E. SCHUYLER, JR.
Attesting Officer                                   Commissioner of Patents